United States Patent [19]

Chen et al.

[11] Patent Number: 5,666,362

[45] Date of Patent: Sep. 9, 1997

[54] METHOD AND APPARATUS FOR ASYNCHRONOUS PPP AND SYNCHRONOUS PPP CONVERSION

[75] Inventors: Cheng T. Chen, Marlboro; Reginald P. Best, Somerset; Daniel M. Brennan, Hillsdale, all of N.J.

[73] Assignee: 3COM Corporation, Santa Clara, Calif.

[21] Appl. No.: 506,533

[22] Filed: Jul. 25, 1995

[51] Int. Cl.⁶ ........................................... H04J 3/22
[52] U.S. Cl. ............................... 370/420; 370/466
[58] Field of Search ........................ 370/79, 84, 99, 370/102, 105.1, 110.1, 420, 466, 467, 353, 354, 355, 356, 476

[56] References Cited

U.S. PATENT DOCUMENTS

| | | | |
|---|---|---|---|
| 5,177,738 | 1/1993 | Dell'Oro et al. | 370/84 |
| 5,309,440 | 5/1994 | Nakamura et al. | 370/85.1 |
| 5,444,703 | 8/1995 | Gagliardi et al. | 370/60.1 |
| 5,448,560 | 9/1995 | Chen et al. | 370/102 |
| 5,461,620 | 10/1995 | Bergler et al. | 370/84 |
| 5,530,894 | 6/1996 | Farrell et al. | 395/800 |

*Primary Examiner*—Douglas W. Olms
*Assistant Examiner*—Min Jung
*Attorney, Agent, or Firm*—Townsend and Townsend and Crew, LLP

[57] ABSTRACT

A data communication system referred to as an Asynchronous/Synchronous Converter is provided to facilitate the communications between a data terminal equipment (DTE) device using the asynchronous communication port, and a dial-up router located in a digital network. When running a dial-up TCP/IP program over the asynchronous port, DTEs use a protocol called Asynchronous Point-to-Point Protocol (Asychronous PPP). On the other hand, dial-up routers usually support Synchronous PPP. The data communication system of the invention connects the DTE to the digital network and ultimately to the dial-up router and provides two way conversion between Asynchronous PPP and Synchronous PPP that is transparent to both the DTE and the router. This two way conversion is enabled in part by the converter intercepting and storing certain link control protocol (LCP) packets and using data in those packets to effect a translation.

18 Claims, 6 Drawing Sheets

ASYNCHRONOUS TRANSMISSION

SYNCHRONOUS TRANSMISSION

METHOD AND APPARATUS FOR ASYNCHRONOUS PPP AND SYNCHRONOUS PPP CONVERSION

BACKGROUND OF THE INVENTION

This invention relates to transmission of information between two or more digital devices. More particularly, this invention relates to a method and apparatus capable of two-way data transmission and translation between a device communicating according to an Asychronous Point-to-Point Protocol (Asynchronous PPP) and a device communicating according to a Synchronous Point-to-Point Protocol (Synchronous PPP).

For many decades, digital computer users have interacted with centralized computing resource from remote locations. Long before the advent of the personal computer (PC), remote users communicated with large central mainframe computers by using a remote dumb terminal connected to a modem communicating over standard public telephone lines. A modem is a device that accepts binary encoded data (generally represented as a square wave with two voltage levels, −12 and +12 volts) and translates that data into signals that can be easily transmitted over the public phone network. Generally, the modem translates the binary values into two or more audible frequencies by modulating an audible carrier frequency signal. This modulated carrier is then transmitted over the phone lines, and a modem on the other end of the line demodulates the carrier signal to recover the binary data and transmits that data to the central computer. Thus the name "modem," which is a contracted combination of "modulate" and "demodulate." In the art, generalized names have been used to refer to the modem and dumb terminal, with the modem or other equipment the provides communication services referred to as a DCE (for Data Communicating Equipment, formerly Data Circuit-terminating Equipment) and the dumb terminal or other equipment that receives the digital data (such as a PC or digital phone) referred to as a DTE (for Data Terminal Equipment).

As computing has evolved from large mainframes connected to dumb terminals to large networks of PCs in an office sharing resources and data via a local area network (LAN), the modem has remained. Modems today typically connect a home or remote office PC to a central LAN. However, modem communication has increasingly not kept up with the need for modern PC users to receive complex digital, digitized audio, and digitized video at home with the same level of service and speed that they are used to receiving when working in an office directly connected to the office LAN. The fastest commercially available modems today can transfer data at a rate of about 28.8 Kilo bits per second (Kbps). While this is a vast improvement over the data rates of 300 bps common just 15 years ago, it is still substantially slower than the 1 to 10 to 100 Mega bps (Mbps) possible for communications in an interoffice LAN.

One limitation to the speed with which remote users can communicate with a central computer or LAN is use of standard public phone lines. Because of the electrical and transmission line characteristics of the public phone network, binary data cannot be directly transmitted as simply two voltage levels. The data must first be modulated onto an audible carrier signal. This limitation is being increasingly removed as public phone companies are providing a new separate service to home and business users called ISDN (for Integrated Services Digital Network). ISDN lines may look like and enter the home as an ordinary telephone line, but in fact connect to a separate ISDN service. This service allows for direct transmission of digital data throughout the ISDN network without the need for modulation onto an audible frequency. Standard ISDN lines are now available to many home users, both in the United States and in other parts of the world. In the U.S., ISDN lines are available to home users starting at about $30 per month. The least expensive ISDN service can transmit data at a rate of 64 Kbps.

However, commercially available PC's on the market today cannot communicate directly with an ISDN line. Therefore, a DCE device is required for communicating data to and from the PC (or other DTE) and then transmitting and receiving data over the ISDN according to the ISDN's protocol. A number of such DCE devices have become recently commercially available. While these devices do not modulate a carrier frequency as do standard analog modems, these new ISDN DCE devices are often referred to as "ISDN modems" or "digital modems." In order to avoid confusion, the type of DCE device provided by the present invention is referred to herein as a "converter" because in addition to providing an ISDN connection to a PC, it converts between two different types of data transmission, namely asynchronous and synchronous transmissions, as described below. A full understanding of the present invention requires some knowledge of packet-based data transmission as well as synchronous versus asynchronous data transmission and these topics are discussed below.

Point-to-Point Packet Protocols For Remote Users

Before the advent of the PC, communications between remote DTEs and central computers operated on generally a character-by-character transmission. Since the remote terminals were dumb, i.e. generally incapable of independently performing any computing tasks for the user, there had to be communication between the DTE and the central computer each time the user wished any computing action to be taken, and as a result, dumb terminals typically transmitted characters of data to the central computer as each character was typed by the user. PCs have dramatically changed this paradigm. When using a PC, most computing operations and application programs execute locally on the PC, with the remote computing resource contacted only intermittently, perhaps just to load or receive files or other data to or from the PC.

In order to facilitate intermittent communications between PC's and a central computing resource (such as a file server) within a LAN, a number of packet-based communications protocols have been adopted. One set of such protocols in referred to as TCP/IP (for Transmission Control Protocol/Internet Protocol). The TCP/IP protocols are defined in a series of documents released by the Internet Engineering Task Force. The documents are referred to as RFC's (for Request For Comment). These documents are available over the Internet at URL http://www.cis.ohio-state.edu:80/hypertext/information/rfc.html or via FTP at ds.internic.net. The protocols specify a number of conventions for use in packet communications, such as how data in the packets is organized, the packet headers, packet addressing, etc. Using these protocols, a PC sends and receives data from a centralized computing resource in packets, only when needed, and generally in response to a specific request from the user.

Within the network itself, packet communications under TCP/IP are generally multipoint communications, that is, multiple receivers are connected to a network line and a transmitter sends out packets on the network and any number of receivers or all receivers listen to the packet, but only those receivers to whom the address in the packet header indicates are addressed to actually examine the data in the packet. The packet must contain the address of the sender and the intended receiver.

An additional set of protocols has been developed for sending and receiving TCP/IP packets at a remote PC over a phone line. These protocols are referred to as PPP (for Point-to-Point Protocols, the predecessors to these PPP protocols where referred to as SLIP for Serial Line Internet Protocol). The PPP protocols are described in RFC1661, RFC1662 and RFC1663, available from the IETF. The name PPP refers to the fact that this protocol is distinct from multipoint protocols in part because it is not necessary for every packet transmitted over the PPP connection to contain a source or an initial destination address. This is true because the PPP connection is between just two devices; any packet transmitted by one device must necessarily be received by the other device.

The protocols just discussed all fit into a layered networking standard. In a layered standard, various necessary networking tasks are broken down and organized into a number of layers, based on the level of abstraction at which the data is being considered by those tasks. Different protocols may operate at different layers. For example, the lowest layer is generally referred to as the "physical layer" and defines the physical means by which data signals are transmitted. The physical layer may incorporate one of various protocols for transmission via wires, optical fiber, radio waves, or the telephone system. As part of the layered standard, protocols operating at one layer must communicate with a variety of different possible protocols at the next lower and next higher layer. The layers are somewhat independent in that regardless of which physical layer protocol is used, at the next highest layer, often called the "data link layer," the same packetizing and addressing protocol may be used. The PPP documents referred to above discuss data transmissions at three layers: the physical layer, the data link layer, and the network layer and specify protocols that primarily operate at the data link layer.

Asynchronous and Synchronous Communications at the Physical Layer

At the physical layer, an important characteristic in the transmission of data over a wire is whether the communications are bit-synchronous or bit-asynchronous. Standard modems transmit data asynchronously. In asynchronous transmission, bits of data are transmitted in very short groups, generally 8-bit bytes. Each byte of data is preceded by an additional START BIT and is followed by at least one STOP BIT. The term asynchronous is used because there is no shared clock between the transmitter and the receiver. One limitation to the speed with which standard modems may transmit data is the use of asynchronous communications. Each 8-bits of data transmitted require at least 2 additional non-data bits to be transmitted. FIG. 1 illustrates an example of transmission of 2 bytes of data 10a (01111110), and 10b (11100000) using an Asynchronous transmission. Each byte of data is preceded by a start bit 12a and followed by a stop bit 12b.

ISDN lines and ISDN modems transmit data synchronously. In synchronous transmission, bits of data are transmitted continuously in long groups. There are no START BITS or STOP BITS and once data transmission commences, as far as the physical layer is concerned, it can continue indefinitely. The term synchronous is used because there is a shared clock between the transmitter and the receiver. The shared clock is generally carried by and recovered from the data stream itself. This is possible because each bit in a synchronous data stream is encoded as a voltage transition from either high to low (a "0" bit) or from low to high (a "1" bit). There is therefore a guaranteed transition during every clock cycle, and from these transitions, a clock at the receiver can be continuously synchronized with the data stream using a known circuit such as a phase lock loop. Contrast this with asynchronous transmissions, where single voltage levels are used to encode logical 0's and 1's. In asynchronous transmission, during transmission of a byte consisting of eight 1's such as 11111111 there will be no voltage transitions and therefore no way for a receiver to recover a clock from the data stream. FIG. 2 illustrates an example of transmission of 3 bytes of data 10a, 10b, and 10c using a synchronous transmission protocol. Byte 10c is only partially illustrated.

Asynchronous communication has proven to be the most widely adopted method of communication thus far over the public telephone lines using a modem. This is partly due to the different amounts of delay and distortion that may be experienced in an audible signal through a public telephone network. An asynchronous transmission is less sensitive to this distortion than a synchronous transmission. Essentially all PCs sold today include an asynchronous communications port as standard equipment. This port is generally controlled by a standard IC known as a UART (Universal Asynchronous Receiver/Transmitter). A number of network software products include software drivers for transmitting data over the asynchronous port. In order for a PC equipped with an asynchronous port to communicate with a synchronous transmitter such as an ISDN line, the PC must be provided with an apparatus for translating between asynchronous bit streams and synchronous bit streams. According to applicant's invention, a PC is provided with such an apparatus which translates bits at the physical layer between asynchronous and synchronous as well as providing higher-layer translation as discussed below.

Asynchronous Byte Stuffing and Synchronous Bit Stuffing

Among the higher-layer issues that a converter such as applicant's invention must handle is translating the manner in which control codes are transmitted in asynchronous and synchronous communications. Control codes are codes used by transmitter to signal certain conditions to the receiver. These conditions might include the start of transmission of a block of data, the end of transmission of a block of data, a signal that the transmitter is ready to send, a signal that one of the data devices is ready to receive, etc. According to the most commonly used protocol asynchronous communication can have up to 32 different control codes; codes that are very commonly used are XON (00010001) and XOFF (00010011), which stand for transmission-on and transmission-off. In both asynchronous and synchronous communication, an immediate problem arises with the use of control codes. Control codes are essentially a particular string of bits defined to be a control code. However, users transmitting data generally must have available to them the ability to transmit any of the 256 possible different bytes of data, including bytes that are identical to the control codes. The protocol, therefore, must provide a method for distinguishing in a data stream when a particular bit pattern is simple part of the data versus when it is a control code. In asynchronous communications, that method is referred to as "byte stuffing;" in synchronous communication, that method is referred to as "bit stuffing."

According to the most common asynchronous communication protocols, "byte stuffing" occurs as follows. A particular asynchronous protocol can define any of the first 32 possible 8-bit bytes (00000000 through 00011111) to be control codes. No bytes need be defined as control codes, but if at least one byte is defined as a control code, than an additional byte, known as the escape character (ESC), must also be defined as a control code. Those bytes that are control codes may be determined at the outset by the protocol or may be negotiated between the receiver and transmitter before data transmission begins. After the control codes are determined, an asynchronous transmitter may use the control codes to establish a communication session. Once data transmission begins, the asynchronous transmitter monitors each byte of the data stream before it is transmitted and compares that data byte to the defined control codes. When the transmitter detects a data byte that is identical to a control code, the transmitter inserts or "stuffs" an additional byte, the ESC character, just before the data byte. In the art, this action is known as "escaping" the data byte. When the receiver receives this ESC character, it is then aware that the next byte will be a data byte, even though it has the same value as a control code. The receiver discards the first received ESC, and receives the next byte as a data character. The ESC character is also defined as a control character; therefore, if the ESC character appears in the data stream, it too is "escaped" and the data is transmitted as ESC ESC. This method is known as a "byte stuffing" procedure because the ESC byte is stuffed into the data stream before each data byte that is identical to a defined control character. One ESC byte must be transmitted along with the data stream for every data byte that happens to be identical to a control code, thereby slowing down the overall data transmission rate.

According to the most common synchronous communication protocols, "bit stuffing" occurs as follows. Most synchronous protocols define only one control code, known as the flag byte. This code generally has the value 01111110. The flag byte both begins and terminates all transmissions, as whenever the flag byte is received during data transmission, the receiver assumes that the transmission has ended. It is therefore necessary that actual data stream sent to the receiver never includes an unintentional flag byte. This is accomplished using a bit stuffing procedure as follows. Whenever the transmitter detects a string of five 1 bits in a row in a data stream to be transmitted, the transmitter inserts a single 0 into the transmitted data stream just after the string of five 1's. This 0 is inserted whether the bit following the five 1's is a 0 or a 1. In this way, the transmitter guarantees that any string of six 1's seen by the receiver will be part of a flag byte. The 0 is inserted after every five 1's regardless of the value of the sixth bit to make it possible to restore the original data at the receiver. When the receiver receives the data stream, it detects all strings of five 1's, at that point the receiver examines the sixth bit. If the bit is a 0, it is discarded by the receiver and the receiver continues to receive data bits; if the sixth bit is a 1, then the received knows that it has received a valid flag byte.

Asynchronous PPP and Synchronous PPP

A final issue that a converter such as applicants' invention must handle is capturing and translating data packets that are sent at still higher layers of the network standard. The previously discussed PPP protocols that are described in RFC1661, RFC1662 and RFC1663 in fact define two separate but related protocols, one for Asynchronous PPP and another for Synchronous PPP. These protocols differ, among other things, in their exchange of Link Control Protocol (LAP) packets, which are data packets that are used at the link control layer to format certain transmission parameters of the link. In Asynchronous PPP, LCPs are is used to negotiate and configure the Asynchronous Control Character Map (ACCM). The ACCM is a 32 bit flag field that defines which of the 32 possible control characters should be escaped accordingly to the encoding rules defined in RFC1662. A "1" in a particular location in the ACCM flag field indicates that the corresponding control code must be escaped. A "0" in a particular location in the ACCM flag field indicates that the corresponding control code need not be escaped. ACCM can be negotiated using the parameter negotiation protocols defined in RFC1661 and RFC1662. The default ACCM for Asynchronous PPP is FFFFFFFF hex indicating that all control characters (ASCII 0-1F hex) are escaped; the default ACCM for Synchronous PPP is 0 indicating that no control characters are escaped. While the Synchronous PPP protocol allows a transmitter to specify an ACCM, in fact at present no Synchronous devices known to the inventors actually use an ACCM or escape any control characters. A converter from Asynchronous PPP to Synchronous PPP must provide an effective means for translating between the two protocols at the data link layer.

From the above it may be seen that what is needed is an Asynchronous to Synchronous Converter that provides transparent and two-way translation between an Asynchronous PPP connection and a Synchronous PPP connection at both the physical and higher layers of the network standard.

SUMMARY OF THE INVENTION

The present invention is an Asynchronous PPP to Synchronous PPP Converter (which includes an ISDN modem) that allows standard computers having an asynchronous port and asynchronous PPP driver software to transparently communicate with a synchronous connection such as that provided by an ISDN line. The present invention communicates with the DTE using Asynchronous PPP and with a remote router over an ISDN connection using Synchronous PPP. When it receives an Asynchronous PPP packet, a converter according to the invention removes the byte-insertion based Asynchronous PPP packet formatting and then encapsulates the data into a bit-insertion based Synchronous PPP packet. When the invention receives a Synchronous PPP packet, it removes the synchronous PPP formatting and encapsulates the data into in an Asynchronous PPP packet.

The present invention accomplishes this transparent translation by capturing and storing all ACCM's sent by the Asynchronous PPP or the Synchronous PPP connection and removing the ACCMs from the data stream before transmitting the packets. The invention uses the stored ACCM's to properly strip or add escape characters as needed for the protocol specified by each device. The present invention accomplishes these tasks through a unique combination of software controlled methods and hardware components. Though the invention is described in light of a particular hardware implementation, the methods of the invention may also be practiced on other hardware configurations or solely in software.

DETAILED DESCRIPTION OF SPECIFIC EMBODIMENTS

Figure 1:
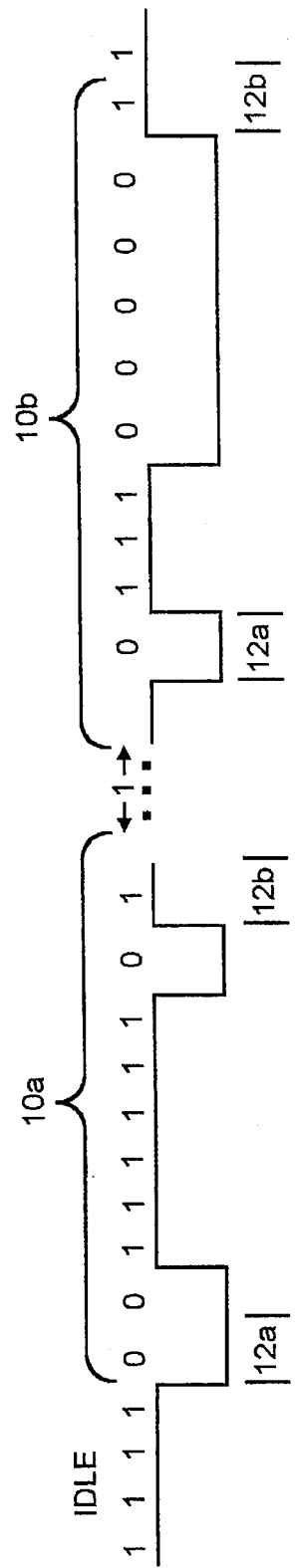
FIG. 1 is a timing diagram of an asynchronous transmission.
Figure 2:
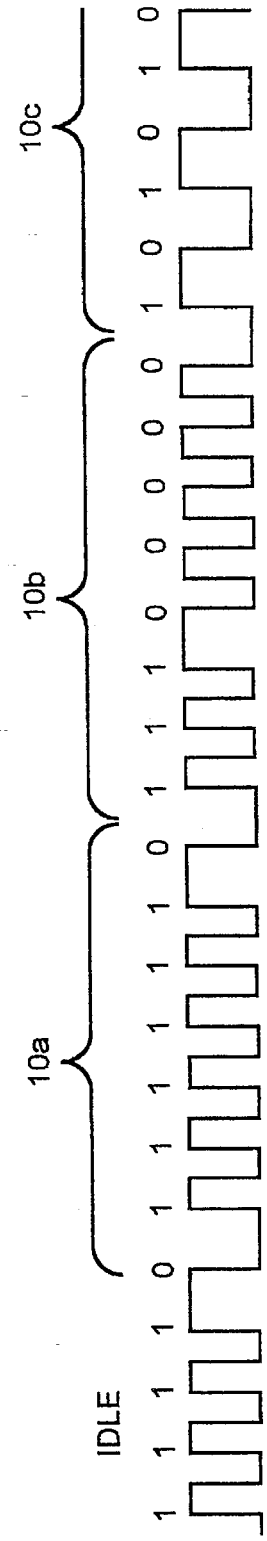
FIG. 2 is a timing diagram of a synchronous transmission.
Figure 3:
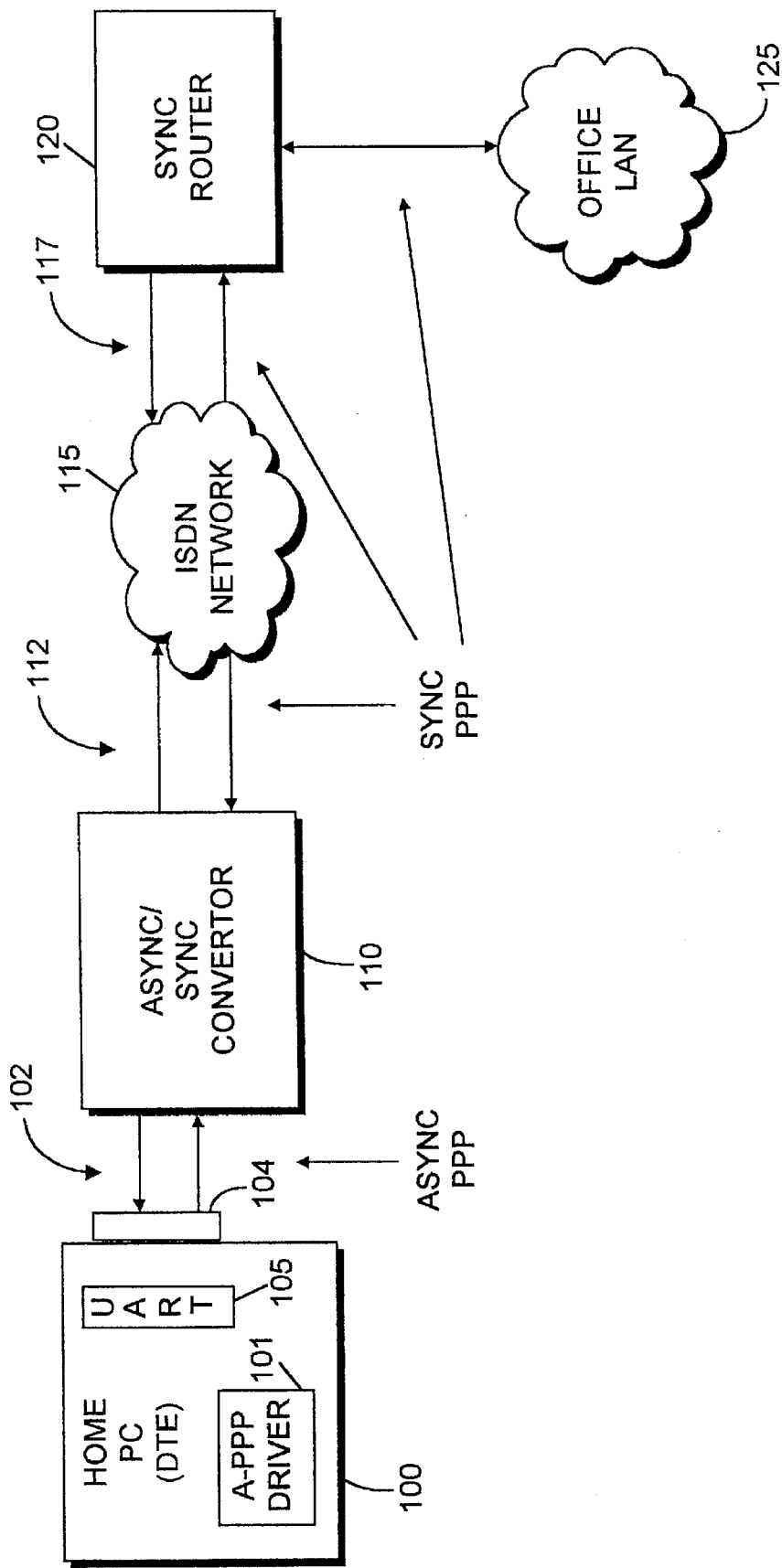
FIG. 3 is a block diagram of a home PC using a converter to communicate with a synchronous router on an office LAN according to the invention.

FIG. 3 is a block diagram of a data communication connection using a converter according to an embodiment of the present invention. FIG. 3 shows DTE 100 in communication with a centralized computer network 125 through an Asynchronous/Synchronous converter 110 according to the invention. In a particular embodiment, DTE 100 might be a home PC that a telecommuting user uses at home to interface with her office LAN 125. Using an Asynchronous/Synchronous PPP converter 110 according to the invention to establish an ISDN connection to the office LAN, the home user can achieve data transmission speeds at home that are significantly faster than could be achieved with conventional modems. DTE 100 could also be any other type of digital device, such as a digital phone or digital video device.

DTE 100 includes a two-way asynchronous port 104, which is controlled by UART 105. An asynchronous port such as 104 is provided as standard equipment on most PCs sold today. UART 105 is a standard commercially available computer circuit designed to accept data from a DTE processor or memory and convert that data into a format suitable for asynchronous transmissions. UART 105 may be programmed to handle lower layer asynchronous transmission protocol. It may be a separate chip, such as the 16550, or it may be circuitry included onto a larger controller chip. DTE 100 also includes Asynchronous PPP driver software 101. This software handles higher layer Asynchronous PPP functions, such as organizing data into Asynchronous PPP packets as well as responding to LCP packets and configuring an ACCM. According to the invention, Asynchronous PPP driver software 101 may be standard network software for connection to an Asynchronous PPP network. Driver 101 need not be aware that translation to Synchronous PPP is occurring before the data is actually transmitted on the network. According to one embodiment of the invention, the driver software implements an Asynchronous PPP protocol as defined in RFC1662. Connection 102 and converter 110 may be external to the physical housing of the PC, or converter 110 may be located within the PC housing, in which case connection 102 will be within the PC.

As described in more detail below, when DTE 100 is transmitting, converter 110 buffers the data received from DTE 100 and also converts the data from a Asynchronous PPP formatting to Synchronous PPP formatting. This conversion entails not only translating the signal transmission from asynchronous to synchronous, but also converting the higher layer data link protocol functions of Asynchronous PPP to Synchronous PPP. As the data is converted to a Synchronous PPP, converter 110 transmits the data to a digital carrier network capable of transmitting Synchronous data, such as ISDN Network 115. ISDN 115 is responsible for routing the data to the distant computing resource. The data is delivered by ISDN 115 to a Synchronous Router 120, which has connections 117 to the ISDN network and is capable of receiving Synchronous PPP data packets. Router 120 then translates received data for use on the central computer resource such as office LAN 125.

Converter 110 similarly may receive data from ISDN 115 over connection 112. Data from ISDN 115 is transmitted from the central computer resource Using a Synchronous PPP. Converter 110 receives Synchronous PPP data packets from network 115, buffers them, and translates the data to Asynchronous PPP. Converter 110 then sends that data to its attached DTE 100 using Asynchronous PPP.

Figure 4:
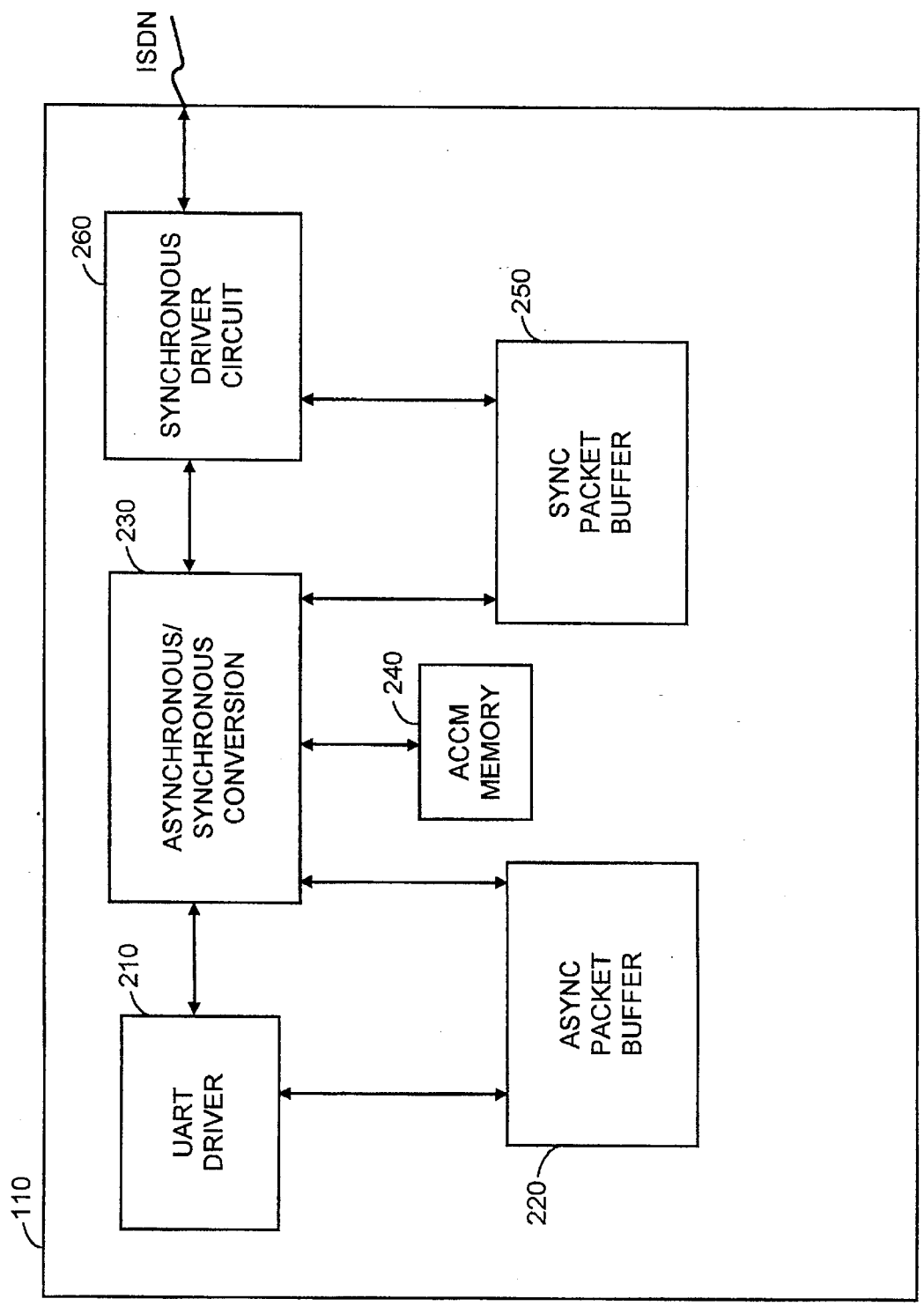
FIG. 4 is a block diagram of an asynchronous/synchronous converter according to the invention.

FIG. 4 is a schematic block diagram of an Asynchronous/Synchronous Converter 110 according to one embodiment of the invention. Converter 110 contains UART Driver circuit 210, Asynchronous Packet Buffer 220, Asynchronous/Synchronous PPP Conversion Circuit 230, ACCM Memory 240, Synchronous Packet Buffer 250, and Synchronous Driver Circuit 260. UART driver circuit 210 receives characters from and transmits characters to UART 105 in DTE 100. As explained above, these characters are transmitted according to a standard asynchronous transmission protocol as defined by UART 105 and as programmed by the driver in DTE 100. The UART driver circuit strips off all start and stop bits of the received data and stores received characters in the Asynchronous Packet Buffer 220. After the characters are received by UART Driver Circuit 210, they are examined by Asynchronous/Synchronous PPP Conversion Circuit 230 to determine when a full packet has been received. When a full packet is received, Conversion Engine 230 reads the Asynchronous PPP packet to determine if it is a LCP packet or a data packet. If the packet is a data packet, Engine 230 simply strips off the Asynchronous PPP formatting including any ESC characters and adds Synchronous PPP formatting and then stores the packet in Synchronous Packet Buffer 250. Once a full packet is present in Synchronous Packet Buffer 250, the packet is transmitted according to a Synchronous PPP on the ISDN line by Synchronous Driver Circuit 260.

For packets from the ISDN line to DTE 110, a reverse procedure is used. One addition to this procedure is that Engine 230 reads from ACCM buffer 240 a DTE-ACCM which specifies those characters that must be escaped according to the Asynchronous PPP requested by the DTE. If any characters need to be escaped, Engine 230 watches for those characters and inserts ESC characters into the data as needed before storing the packets in Asynchronous Packet Buffer 220.

Figure 5:
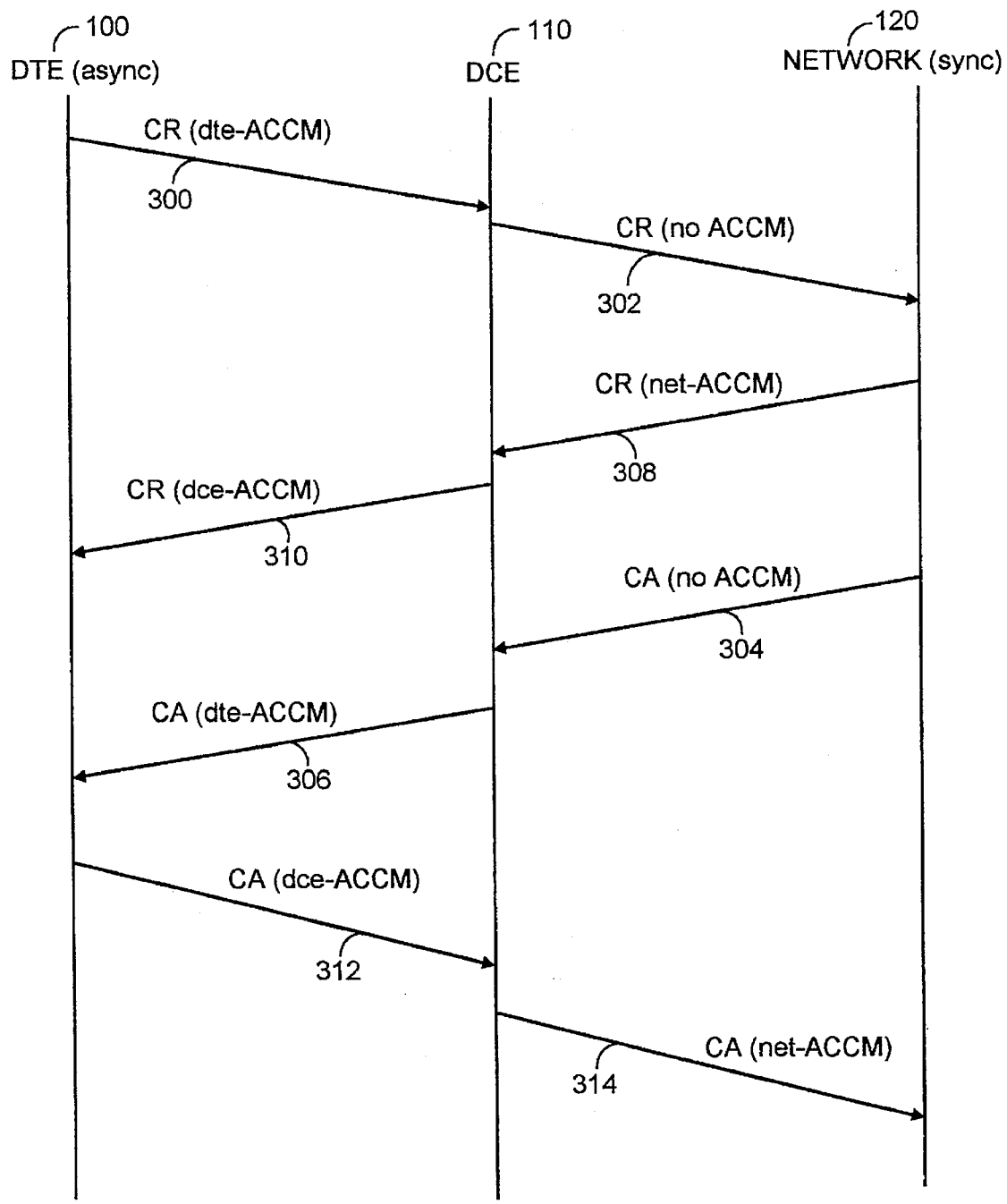
FIG. 5 is a diagram showing the capture translation of ACCM's between a DTE, a DCE and a network according to the invention.
Figure 6:
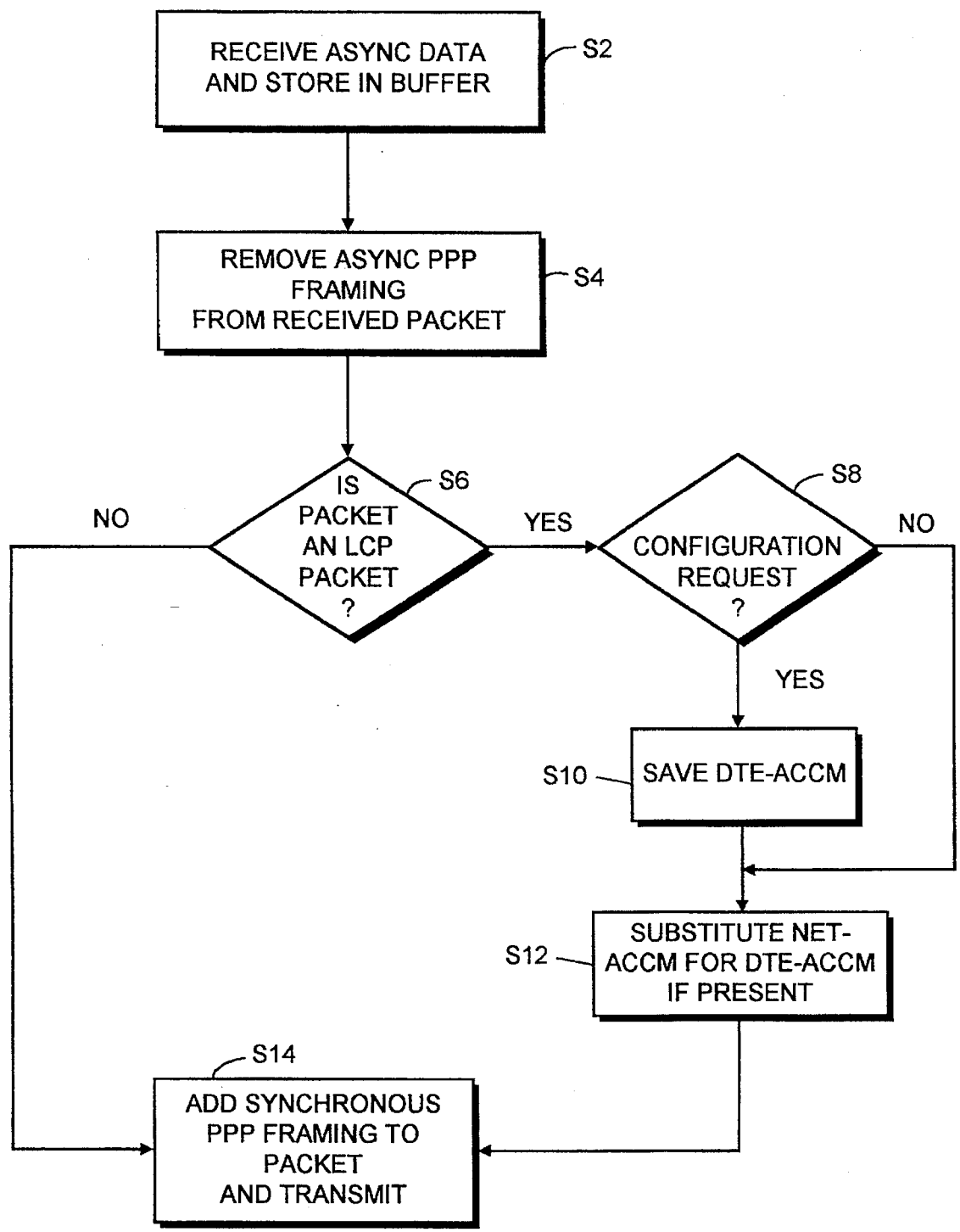
FIG. 6 is a flowchart of the transmission of a packet from an asynchronous PPP to a synchronous PPP.
Figure 7:
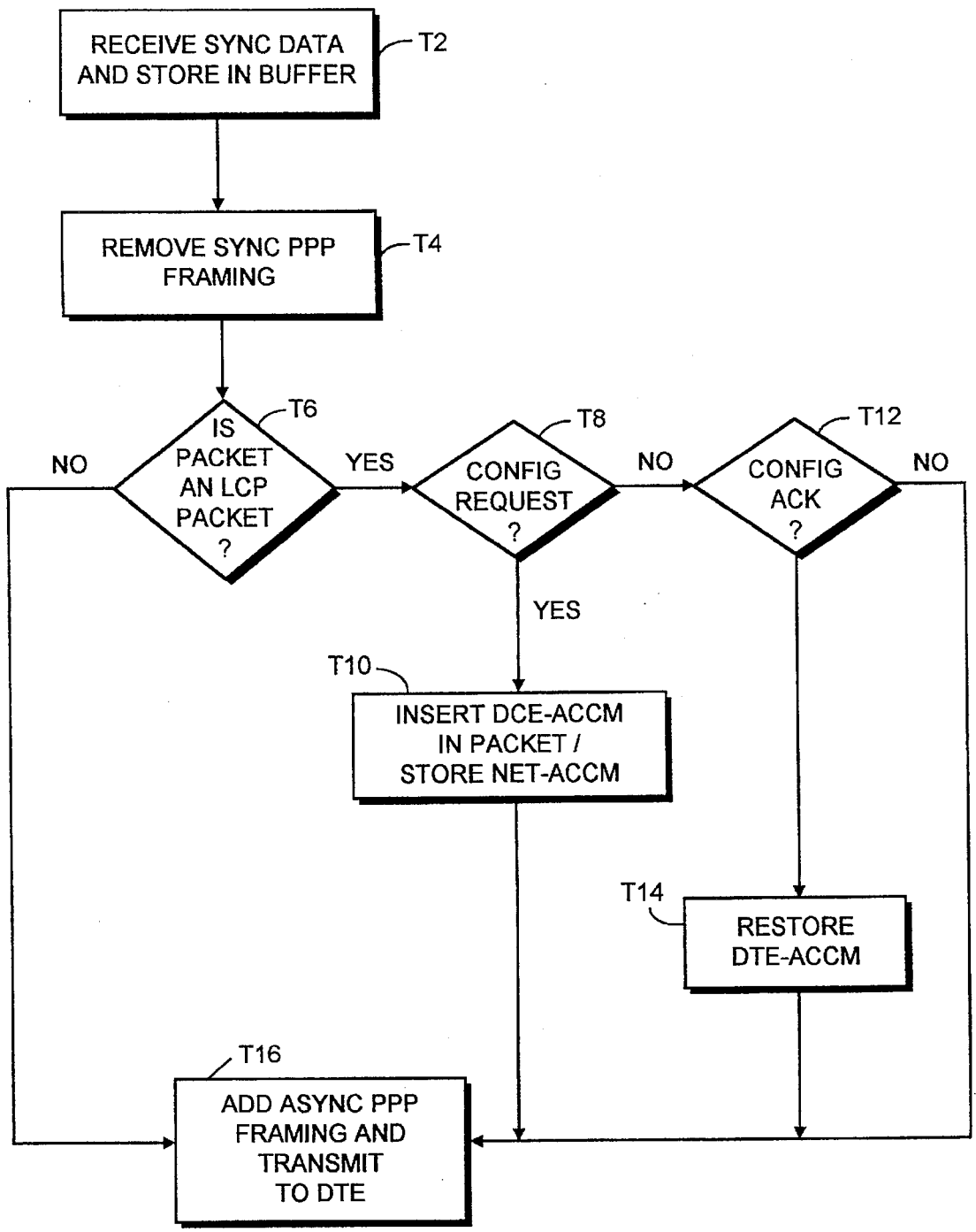
FIG. 7 is a flowchart of the transmission of a packet from a synchronous PPP to an asynchronous PPP.

The operation of Converter 110 will be better understood by reference to FIGS. 5, 6, and 7. FIG. 5 is a diagram illustrating the way in which a converter according to the invention handles LCP packets transmitted between the DTE and the network. The LCP is as specified in RFC1661 and RFC1662. The objective of the converter according to the invention is to specify as few control characters as possible in the respective ACCMs so as to reduce the number of ESC characters that need to be transmitted, but while doing that the converter must ensure that all characters that need to be escaped are properly escaped and must further ensure that LCP packets are properly acknowledged. RFC1661 and RFC1662 define an LCP protocol wherein either side of a PPP connection may transmit an LCP packet containing a configuration request (CR). When either side of a PPP connection receives a LCP CR packet, it must respond with an LCP configuration acknowledge (CA) packet. A DTE device that wishes to have certain characters escaped sends a CR containing an ACCM to the other device on the PPP connection. The DTE device then expects to receive a CA containing the same ACCM back from the other device. If no ACCM is included in a CR packet, the default ACCM is assumed, which in Asynchronous PPP is to escape all control characters and in Synchronous PPP is to escape no control characters.

FIG. 5 illustrates how a converter (or DCE) according to the invention handles LCP CR and CA packets. When DTE 100 sends a CR containing a DTE-ACCM (300), converter 110 stores the DTE-ACCM and then transmits the CR with no ACCM to Synchronous Router 120 over network 115 (302). When Synchronous Router 120 responds with a CA containing no ACCM (304), converter 110 intercepts the CA and restores to it the DTE-ACCM before transmitting it to DTE 100 (306). Similarly, when Router 120 sends a CR containing a net-ACCM (308), converter 110 stores the net-ACCM and then inserts its own DCE-ACCM into the CR packet and transmits the CR with a DCE-ACCM to DTE 100 (310). Note that the net-ACCM in all presently available synchronous devices will either be absent or, equivalently, set to 0, indicating that no bytes need to be escaped for the synchronous device. Whether or not the net-ACCM is present in the CR, converter 110 inserts its DCE-ACCM before transmitting the CR to the DTE. The DCE-ACCM will also ideally be 0, indicated that no characters need be escaped in transmissions from DTE 100 to DCE 110. However, when converter 110 is configured to perform XON/XOFF over its asynchronous connection, the DCE-ACCM will be 000A0000 hex, indicating that DTE 100 must escape the XON/XOFF control codes. When DTE 100 responds with a CA containing the DCE-ACCM (312), converter 110 intercepts the CA and restores the net-ACCM or if there is no net-ACCM, deletes the DCE-ACCM before transmitting the CA to Router 120 (314).

FIG. 6 is a flow chart showing the process of conversion of Asynchronous PPP packets to Synchronous PPP packets. Asynchronous characters are received at converter 110 and stored in an Asynchronous Packet Buffer (Step S2). When a Asynchronous PPP packet is fully received from the DTE, the Asynchronous PPP formatting is removed, with escape characters deleted. (Step S4). Then, converter 110 examines the Protocol Identification and Packet Code fields of the asynchronous packet to determine if the packet is an LCP parameter negotiation packet (Step S6). If the packet is not one of the LCP parameter negotiation packets, the packet is encapsulated in a synchronous PPP packet using bit-stuffing and has escape characters added as specified by the net-ACCM if present in memory 240 by converter 110 and then transmitted (Step S14). The packet is transmitted over the ISDN digital network 115 where it may be received by Synchronous Router 120 and then routed on LAN 125.

If the packet is an LCP packet then it is examined further to see if it is a Configuration Request (Step S8). If the packet is a LCP CR specifying an ACCM, then the ACCM specified in this packet is stored in ACCM memory 240 as the DTE-ACCM (Step S10). If the packet is an LCP Configuration Request that does not contain an ACCM, the DTE is implicitly specifying to use the default Asynchronous PPP ACCM of escaping all control characters, and that information is stored in memory 240. In either case, if the LCP packet contains an ACCM, the Packet is modified by substituting the net-ACCM for the DTE-ACCM before being transmitted over the digital network (Step S12). Where there is no net-ACCM, the DTE-ACCM is simply removed from the packet. Removing the ACCM from the LCP packet implies to the Synchronous PPP router that the DTE requests the default Synchronous PPP ACCM (which means that no characters are escaped).

FIG. 7 is a flow chart showing the process of conversion of Synchronous PPP packets to Asynchronous PPP packets. When a PPP packet is received from the digital network, the synchronous PPP formatting is removed. If the packet is not one of the LCP parameter negotiation packets step T6), the packet is encapsulated in an asynchronous PPP packet using the byte-stuffing procedure defined in RFC1662 and those control codes specified in DTE-ACCM are escaped and the packet and is transmitted to DTE 100 over the asynchronous interface (Step T16).

If the packet is an LCP packet, it is further examined to determine if it is a Configuration Request (Step T8). If it is a CR, then the DCE-ACCM is inserted into the packet, any net-ACCM is stored in memory 240 and the packet is transmitted according to Step T16. If the packet is not a CR, it is further examined to determine if it is a Configuration Acknowledge (Step T12). If the packet is a CA, then the DTE-ACCM is restored to the packet from memory 240 before the packet is transmitted according to Step T16.

If the packet is any other LCP parameter negotiation packet, the contents of the packet are examined. If the packet contains any ACCM, the packet is modified by removing the ACCM before it is transmitted to the DTE using the asynchronous PPP procedure described above.

An Appendix totalling 18 pages is attached to this application. The appendix provides detailed circuit schematics for one embodiment of the invention. Applicants request that this Appendix be maintained in the file of the patent application but not be reproduced as part of the patent when issued.

The invention has now been explained with reference to specific embodiments. Other embodiments will be apparent to those of skill in the art. In particular, method steps have been grouped and labelled as being part of various sub-methods in order to increase clarity of the disclosure, however, these steps could be differently grouped without changing the essential operation of the invention. Methods according to the present invention may be embodied as a compiled version of this source code stored on a floppy disk, hard disk, optical disk, or in a computer memory. Also, some of the methods described above as performed by hardware could be performed by software and vice versa. It is therefore not intended that this invention be limited, except as indicated by the appended claims.

What is claimed is:

1. A converter for two-way communication between a first device using asynchronous communication (the asynchronous device) and a second device using synchronous communication (the synchronous device) comprising:

an asynchronous driver capable of two way asynchronous communication with said asynchronous device;

a synchronous driver capable of two way synchronous communication with said synchronous device;

an asynchronous data buffer for storing units of asynchronous data received from said asynchronous device and for storing units of asynchronous data prior to transmission to said asynchronous device;

a synchronous data buffer for storing units of synchronous data received from said synchronous device and for storing units of synchronous data prior to transmission to said synchronous device;

an asynchronous/synchronous translator capable of translating between asynchronous and synchronous data formats, said translator capable of reading complete units of asynchronous data from said asynchronous data buffer, translating control fields and formatting to a form suitable for synchronous transmission, and storing complete units of synchronous data into said synchronous data buffer, said translator further capable of reading complete units of synchronous data from said synchronous data buffer, translating control fields and formatting to a form suitable for asynchronous transmission, and storing complete units of asynchronous data into said asynchronous data buffer; and a converter memory for storing protocol control values received from said asynchronous device or said synchronous device, said memory connected to said translator and said translator reading data stored in said converter memory to facilitate in translation.

2. The converter according to claim 1 wherein said translator stores in said converter memory at least a character control map specifying which characters in a transmission from said converter must be escaped.

3. The converter according to claim 2 wherein said translator is enabled to examine packets received from said asynchronous driver to determine if those packets are link control packets containing a received character control map and wherein said received character control map is stored in said converter memory.

4. The converter according to claim 1 wherein said asynchronous data buffer, said synchronous data buffer, and said converter memory are delineated blocks of memory in a shared random access memory.

5. The converter according to claim 1 as used in a data communication network, wherein said data communication network further comprises:
a data terminal equipment (DTE) device having asynchronous driver software and an asynchronous driver circuit, with said asynchronous driver circuit operably connected to an asynchronous connector, with said asynchronous connector coupled to said converter;
a synchronous digital network operably connected to a synchronous connector, with said synchronous connector coupled to said converter; and
a synchronous receiver operably connected to said synchronous digital network for exchanging packets of data with said DTE device over said digital network with translation by said converter.

6. An asynchronous/synchronous converter for two-way communication between an asynchronously communicating DTE device and a synchronous digital network comprising:
an asynchronous driver capable of two way asynchronous communication with a standard universal asynchronous receiver transmitter (UART);
a synchronous driver capable of two way synchronous communication with a digital network;
an asynchronous data buffer for storing asynchronous PPP data packets received from said DTE device and for storing asynchronous PPP data packets prior to transmission to said DTE device;
a synchronous data buffer for storing synchronous PPP data packets received from said network and for storing synchronous PPP data packets prior to transmission to said network;
an asynchronous/synchronous translator capable translating between asynchronous PPP and synchronous PPP formats, said translator capable of reading complete asynchronous PPP packets from said asynchronous data buffer, translating control fields and formatting to a form suitable for synchronous PPP transmission, and storing complete synchronous PPP data packets into said synchronous data buffer, said translator further capable of reading complete synchronous PPP packets from said synchronous data buffer, translating control fields and formatting to a form suitable for asynchronous PPP transmission, and storing complete asynchronous PPP packets into said asynchronous data buffer; and
a converter memory for storing Asynchronous Control Character Map (ACCM) protocol control values received from said DTE device or said network, said converter memory connected to said translator and said translator reading data stored in said converter memory to facilitate in translation.

7. The converter according to claim 6 wherein said translator stores in said converter memory at least a character control map specifying which characters in a transmission from said converter must be escaped.

8. The converter according to claim 7 wherein said translator is enabled to examine packets received from said asynchronous driver to determine if those packets are link control packets containing a received character control map and wherein said received character control map is stored in said converter memory.

9. The converter according to claim 6 wherein said asynchronous data buffer, said synchronous data buffer, and said converter memory are delineated blocks of memory in a shared random access memory.

10. The converter according to claim 6 as used in a data communication network, wherein said data communication network further comprises:
a data terminal equipment (DTE) device having asynchronous driver software and an asynchronous driver circuit, with said asynchronous driver circuit operably connected to an asynchronous connector, with said asynchronous connector coupled to said converter;
a synchronous digital network operably connected to a synchronous connector, with said synchronous connector coupled to said converter; and
a synchronous receiver operably connected to said synchronous digital network for exchanging packets of data with said DTE device over said digital network with translation by said converter.

11. A method for converting link control packets between a DTE device using Asynchronous PPP and a network device using Synchronous PPP comprising the steps of:
detecting each time said DTE sends a configuration request packet containing a DTE-Asynchronous Character Control Map (ACCM), and when such a packet is received storing the DTE-ACCM, deleting the ACCM from the packet, and transmitting said DTE configuration request packet to said network device using a Synchronous PPP;
detecting each time said network device sends a configuration acknowledge packet and when such a packet is received inserting said stored DTE-ACCM into the packet and transmitting said network configuration acknowledge packet to said DTE using an Asynchronous PPP;
detecting each time said network device sends a configuration request packet, and if the packet contains a net-ACCM storing the net-ACCM and removing the net-ACCM from the packet, then inserting a DCE-ACCM into the network configuration request packet and transmitting said configuration request packet to said DTE using an Asynchronous PPP; and
detecting each time said DTE sends a configuration acknowledge packet and when such a packet is received deleting said DCE-ACCM from the packet and inserting said stored net-ACCM into the packet and transmitting said DTE configuration acknowledge packet to said network device using a Synchronous PPP.

12. The method according to claim 11 further comprising the step of:
using said stored DTE-ACCM to determine which characters must be preceded by an escape character before transmission to said DTE using an Asynchronous PPP.

13. The method according to claim 11 further comprising the step of:

using said stored net-ACCM to determine which characters must be preceded by an escape character before transmission to said network device using a Synchronous PPP.

14. A converter for two-way communication between a first device using asynchronous communication (the asynchronous device) and a second device using synchronous communication (the synchronous device) comprising:

an asynchronous driver capable of two way asynchronous communication with said asynchronous device;

a synchronous driver capable of two way synchronous communication with said synchronous device;

an asynchronous/synchronous translator capable of translating between asynchronous and synchronous data formats, said translator capable of reading complete units of asynchronous data received from said asynchronous device, translating control fields and formatting to a form suitable for synchronous transmission, and directing complete units of synchronous data to said synchronous driver, said translator further capable of reading complete units of synchronous data received from said synchronous device, translating control fields and formatting to a form suitable for asynchronous transmission, and directing complete units of asynchronous data to said asynchronous driver; and a converter memory for storing protocol control values received from said asynchronous device or said synchronous device, said memory connected to said translator and said translator reading data stored in said converter memory to facilitate in translation.

15. The converter according to claim 14 wherein said translator stores in said converter memory at least a character control map specifying which characters in a transmission from said converter must be escaped.

16. The converter according to claim 15 wherein said translator is enabled to examine packets received from said asynchronous driver to determine if those packets are link control packets containing a received character control map and wherein said received character control map is stored in said converter memory.

17. The converter according to claim 14 as used in a data communication network, wherein said data communication network further comprises:

a data terminal equipment (DTE) device having asynchronous driver software and an asynchronous driver circuit, with said DTE asynchronous driver circuit operably connected to an asynchronous connector, with said asynchronous connector coupled to said converter;

a synchronous digital network operably connected to a synchronous connector, with said synchronous connector coupled to said converter; and a synchronous receiver operably connected to said synchronous digital network for exchanging packets of data with said DTE device over said digital network with translation by said converter.

18. The converter according to claim 14 wherein said units of asynchronous data received from said asynchronous device are asynchronous PPP data packets, wherein said units of synchronous data received from said synchronous device are synchronous PPP data packets, wherein said translator is capable of formatting said asynchronous PPP packets to a form suitable for synchronous PPP transmission, and wherein said translator is capable of formatting said synchronous PPP packets to a form suitable for asynchronous PPP transmission.

* * * * *